US006572032B2

(12) United States Patent
Chih

(10) Patent No.: US 6,572,032 B2
(45) Date of Patent: Jun. 3, 2003

(54) SWITCH OF STRAIGHT SPRINKLING GUN

(76) Inventor: Gordon Chih, No.33,Tien-Yang Lane,Chao-An Li, Lu-Kang Chen, Changhua Hsien (TW)

( * ) Notice: Subject to any disclaimer, the term of this patent is extended or adjusted under 35 U.S.C. 154(b) by 0 days.

(21) Appl. No.: 09/863,257

(22) Filed: May 24, 2001

(65) Prior Publication Data

US 2002/0175223 A1 Nov. 28, 2002

(51) Int. Cl.7 .............................................. A01G 25/14

(52) U.S. Cl. ....................... 239/375; 239/310; 239/315; 239/581.1

(58) Field of Search ................................ 239/310, 315, 239/316, 375, 538, 581.1; 137/885, 875, 876; 251/345

(56) References Cited

U.S. PATENT DOCUMENTS 2,540,064 A * 1/1951 Weber ........................ 137/605
2,797,132 A * 6/1957 Alpert ................... 137/101.11
2,908,445 A * 10/1959 Schwartz .................... 239/315
3,005,468 A * 10/1961 Erwin et al. ................ 137/556
3,788,603 A * 1/1974 Snider ........................ 137/560
3,874,637 A * 4/1975 Jones et al. ................. 251/339
5,988,911 A * 11/1999 Browne et al. .......... 137/484.2
6,164,496 A * 12/2000 Gregory .................. 222/144.5

* cited by examiner

*Primary Examiner*—Michael Mar
*Assistant Examiner*—Christopher Kim
(74) *Attorney, Agent, or Firm*—Troxell Law Office PLLC

(57) ABSTRACT

Switch of straight sprinkling gun, including an outer sleeve, a middle sleeve, a central tube, a detergent chamber, a main flow tube and a flow damper unit. The middle sleeve is fixedly disposed in the outer sleeve. The central tube is fitted in the middle sleeve. The outer and middle sleeves are synchronously rotatable about the central tube. The detergent chamber surrounds the main flow tube and communicates with one end of the outer sleeve. The flow damper unit includes a flow-guiding hole disposed on the detergent chamber and a communicating section disposed on the outer sleeve. The middle sleeve is formed with an outlet and a first inlet. The central tube is formed with a second inlet. A user can conveniently holds the outer sleeve to real-time adjust the water amount or conduct the detergent contained in the detergent chamber to discharge pure water or mixture of water and detergent.

6 Claims, 8 Drawing Sheets

SWITCH OF STRAIGHT SPRINKLING GUN

BACKGROUND OF THE INVENTION

The present invention is related to a device for adjusting discharge manner and flow amount of a fluid, and more particularly to a switch of a straight sprinkling gun or a sprinkling gun provided with a brush at discharging end.

A conventional straight sprinkling gun substantially is composed of a tube body, a sprinkling head disposed at one end of the tube body and a switch valve disposed at the other end of the tube body. When a user uses the sprinkling gun to sprinkle, the user holds the straight sprinkling gun with both hands. When adjusting the water amount to reach a necessary sprinkling strength, the user must pause sprinkling and one hand of the user must leave the holding section and move to the switch valve for clockwise or counterclockwise rotating the same. Then, the hand is moved back to the holding section to proceed with the sprinkling. This is inconvenient to the user.

Furthermore, as shown in FIG. 8, during sprinkling, sometimes it is necessary to use a detergent such as a soap water to help in cleaning. Accordingly, the middle section of the tube body A is provided with a chamber B reciprocally surrounding the tube body A. A detergent adding hole C is formed on the chamber B and equipped with an openable cover. The tube body A is further formed with a communicating hole A1, whereby after the chamber B is moved, the chamber B is communicated with or not communicated with the tube body A. In use, the soap water is added from the detergent adding hole C into the chamber B and then the detergent adding hole C is closed. The switch valve is opened and the water flows through the tube body A and discharges from the sprinkling head. (At this time, the chamber B is not communicated with the tube body A.) When soap water is needed, the chamber B is moved to communicate with the tube body A, whereby the soap water is mixed with the clean water and conducted and discharged.

According to the above arrangement, the consumption of the soap water is determined by the amount of the water flow. In the case that it is not desired to consume soap water too fast, the user must pause sprinkling to adjust the switch valve and then proceed with the sprinkling. This is also quite inconvenient to the user.

In the above sprinkling gun structure, the soap water selection switch and the water amount controlling switch are separately disposed so that it is inconvenient for a user in adjustment.

SUMMARY OF THE INVENTION

It is therefore a primary object of the present invention to provide a switch of a straight sprinkling gun, in which the water amount is conveniently and real-time controlled without affecting sprinkling operation.

It is a further object of the present invention to provide the above switch of the straight sprinkling gun which has a design meeting human configuration for convenient operation.

It is still a further object of the present invention to provide the above switch of the straight sprinkling gun in which by one action, whether the soap water is conducted and discharged and the consumption speed of the soap water are real-time and conveniently controlled. A user can on one hand sprinkle and on the other hand conduct the soap water without affecting the sprinkling and cleaning operation.

According to the above objects, the switch of straight sprinkling gun of the present invention includes an outer sleeve, a middle sleeve, a central tube, a detergent chamber, a main flow tube and a flow damper unit.

The present invention can be best understood through the following description and accompanying drawings wherein:

DETAILED DESCRIPTION OF THE PREFERRED EMBODIMENTS

Figure 1:
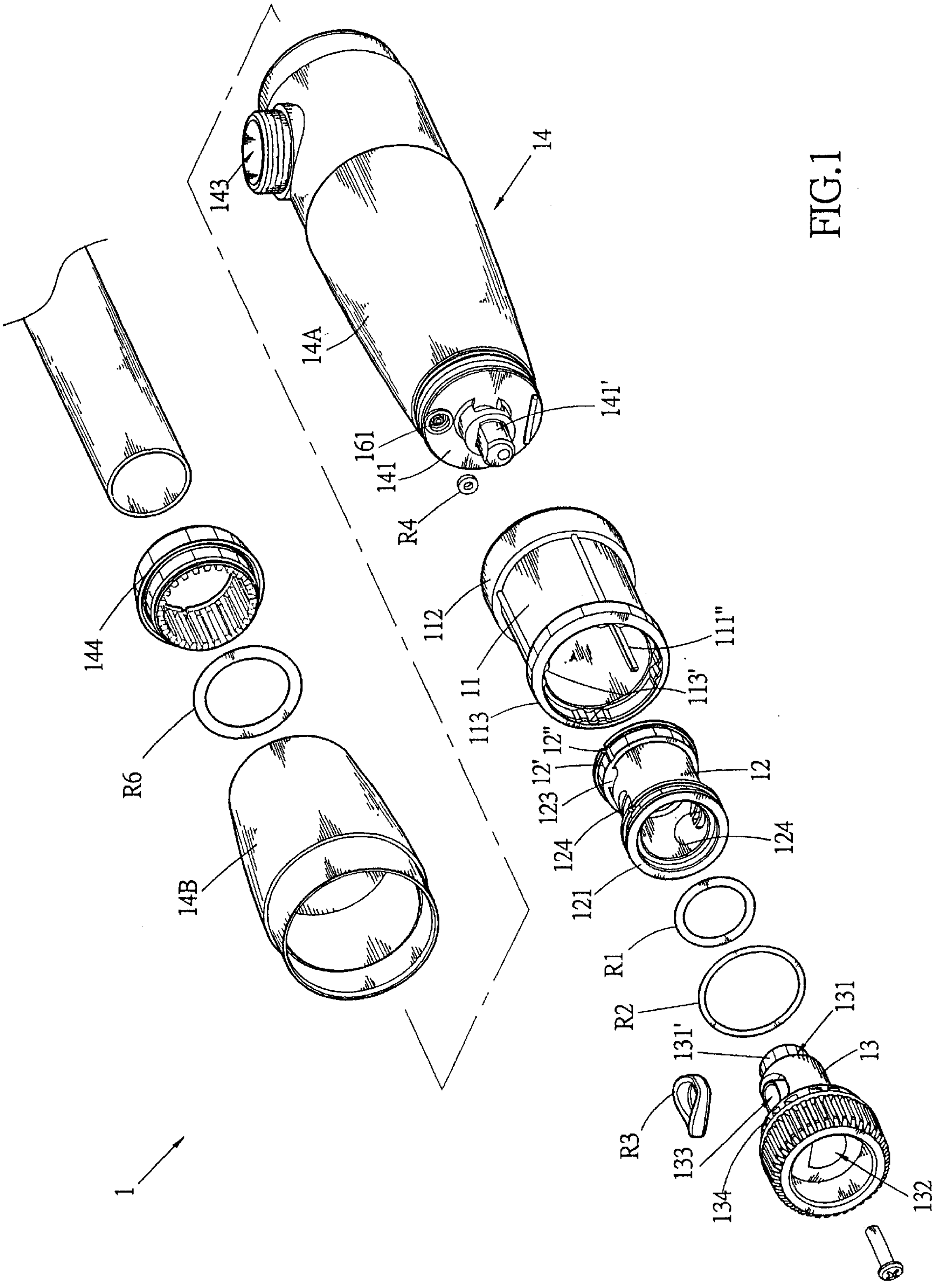
FIG. 1 is a perspective exploded view of a preferred embodiment of the present invention.
Figure 2:
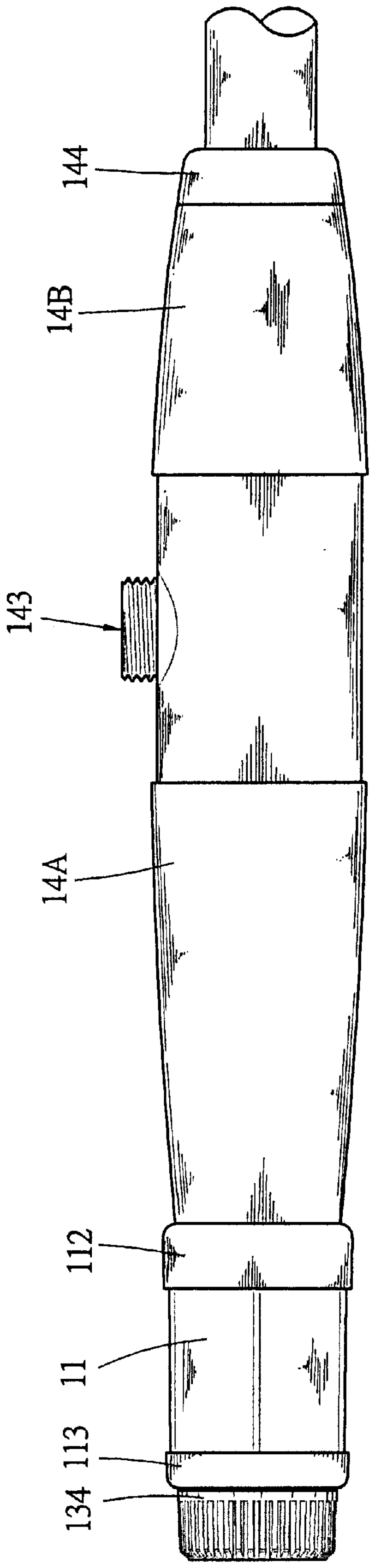
FIG. 2 is a side view of the preferred embodiment of the present invention.
Figure 3:
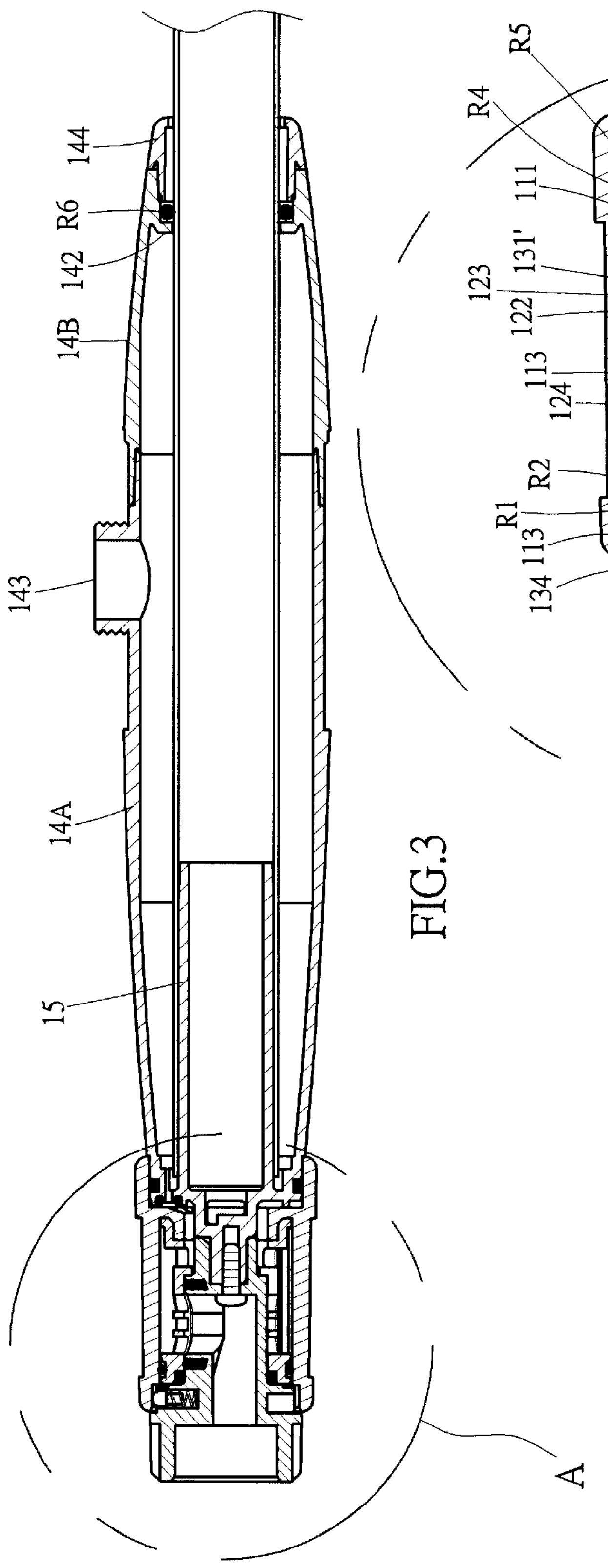
FIG. 3 is a longitudinal sectional view of the preferred embodiment of the present invention.
Figure 3A:
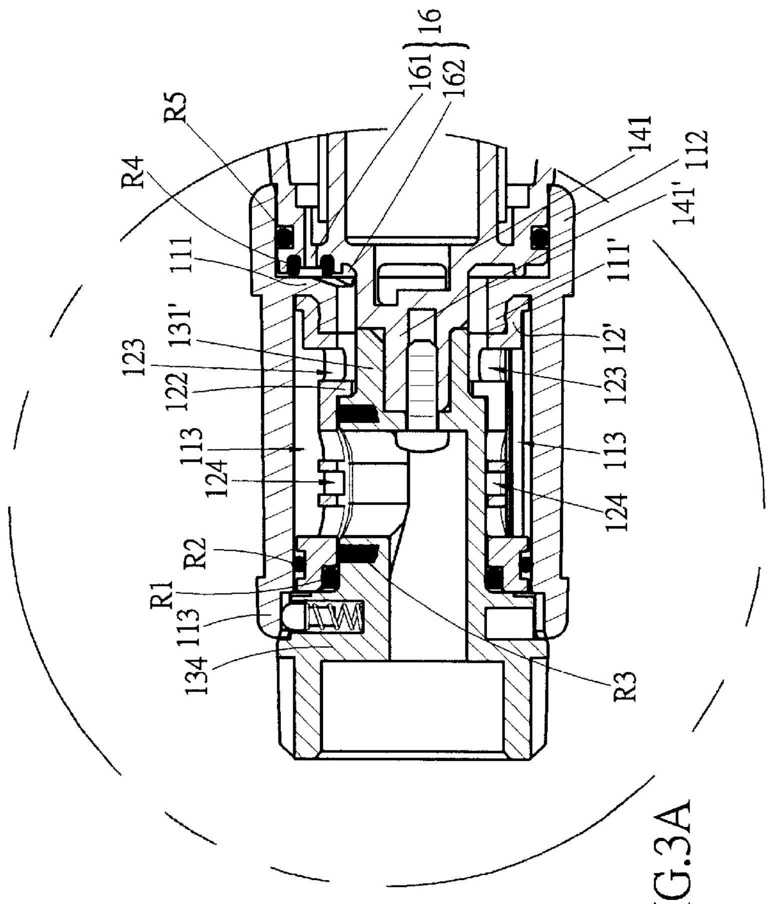
FIG. 3A is an enlarged cross-sectional view of area A in FIG. 3.
Figure 4C:
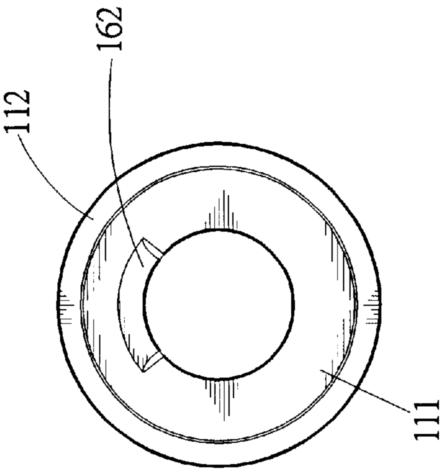
FIGS. 4A–4D are front, side, rear and longitudinal sectional views of the outer sleeve of the preferred embodiment of the present invention.
Figure 4B:
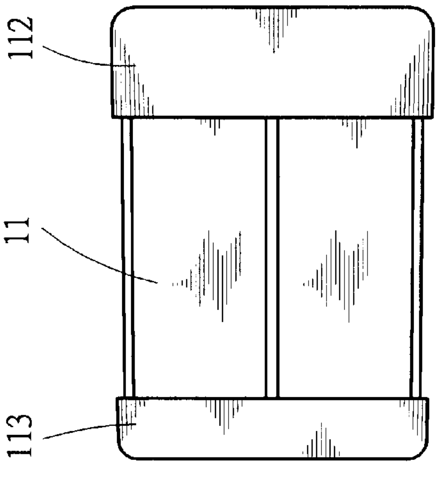
Figure 4D:
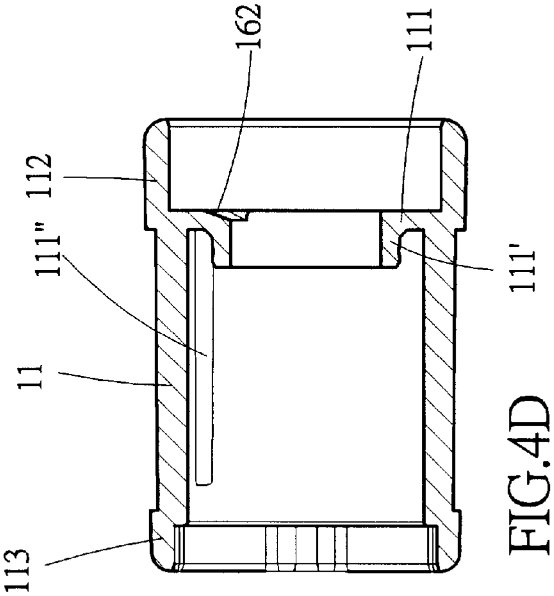
Figure 4A:
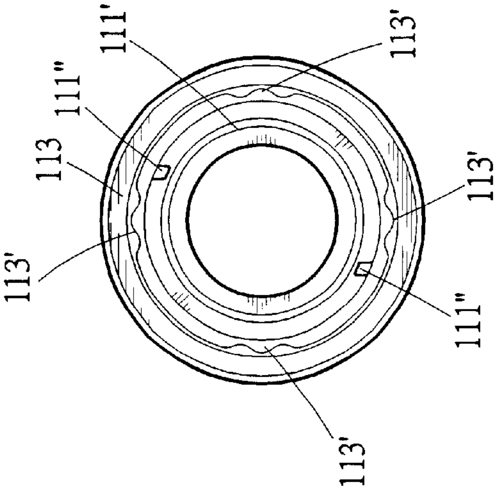
Figures 5A, 5B, 5C, 5D, 5E:
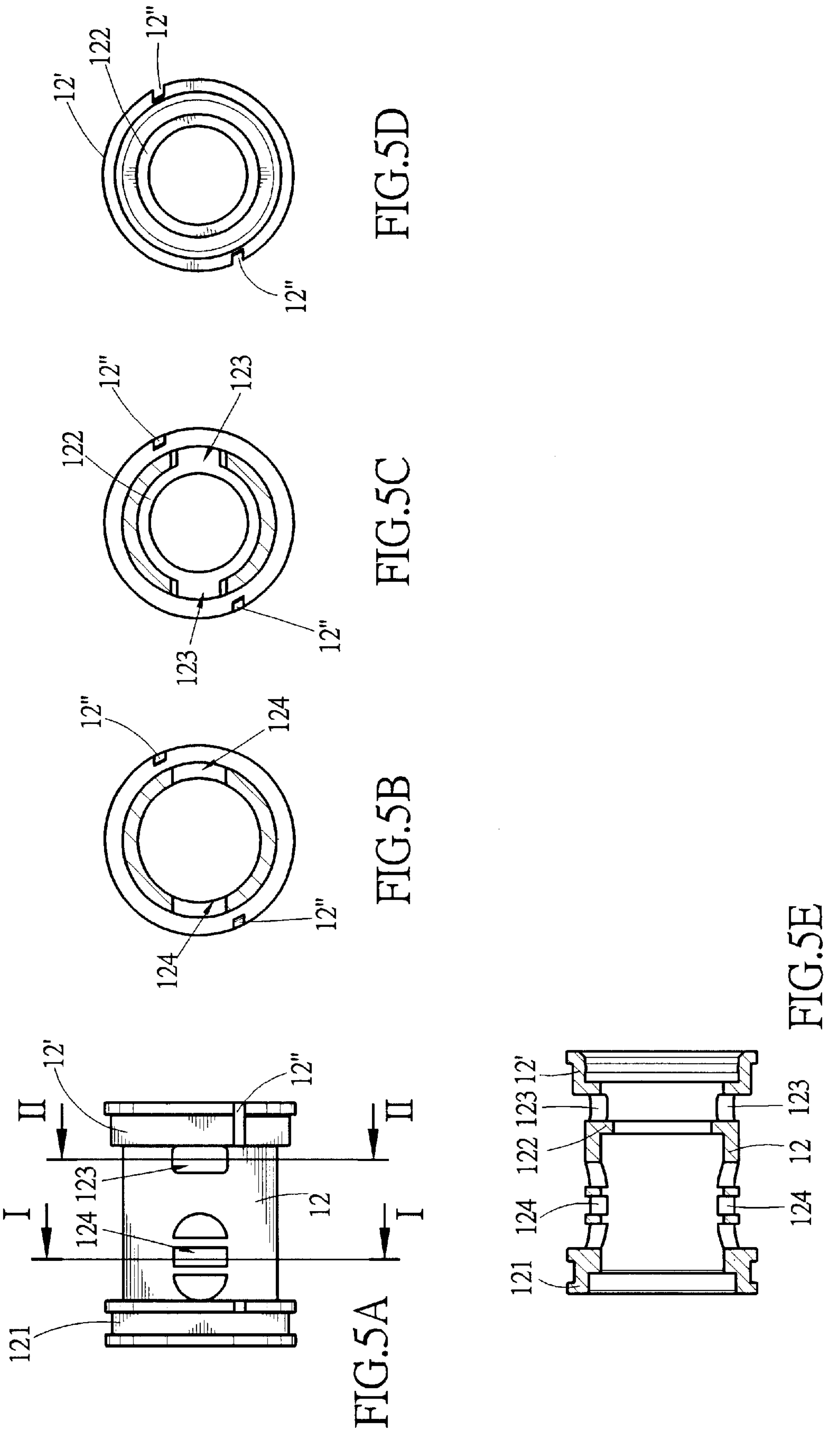
FIGS. 5A–5E are side, I—I sectional, II—II sectional, rear and longitudinal sectional views of the middle sleeve of the preferred embodiment of the present invention.
Figure 6C:
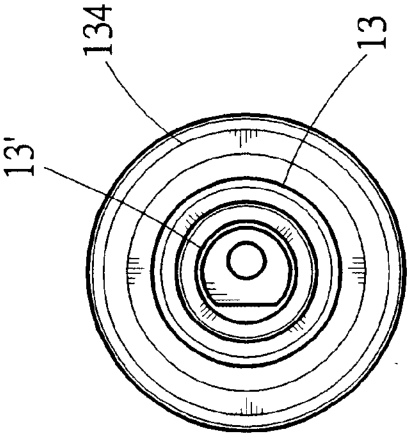
FIGS. 6A–6D are front, top, rear and longitudinal sectional views of the central tube of the preferred embodiment of the present invention.
Figure 6B:
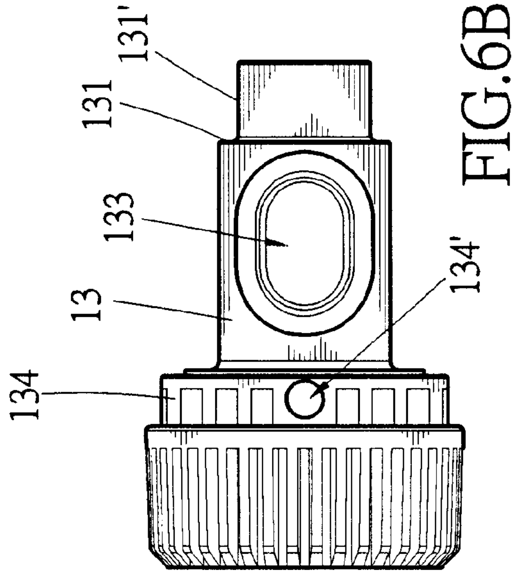
Figure 6D:
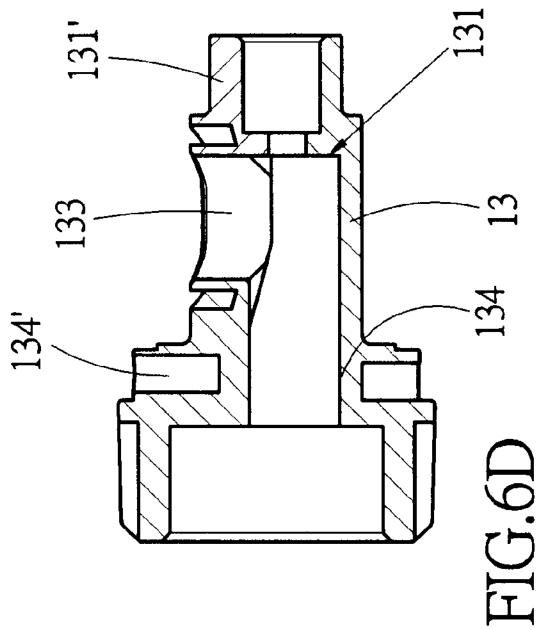
Figure 6A:
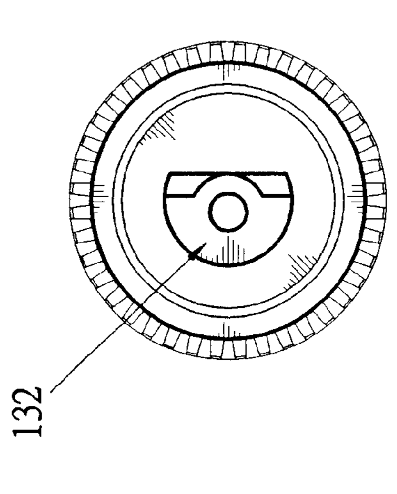
Figure 7B:
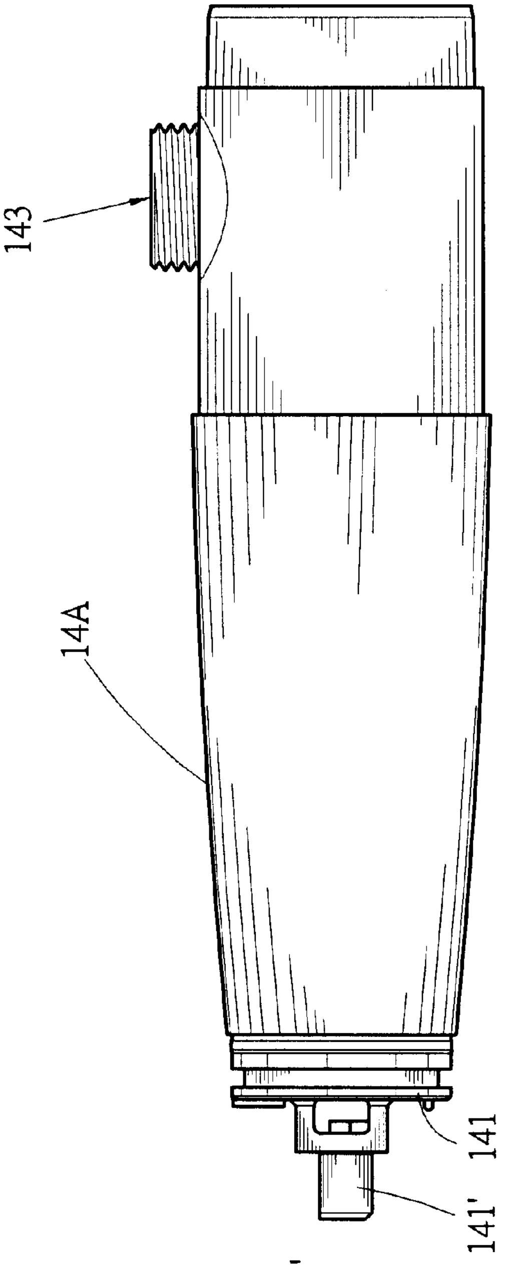
FIGS. 7A–7B are front and side views of the first chamber of the preferred embodiment of the present invention.
Figure 7A:
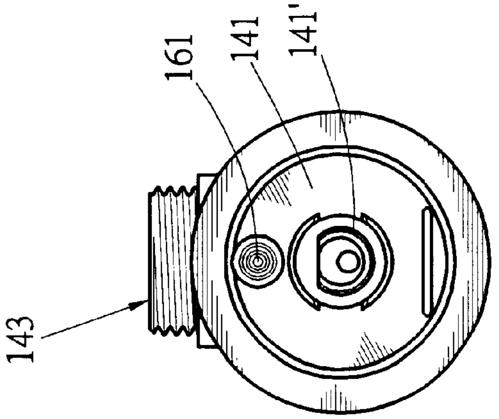
Figure 8A:
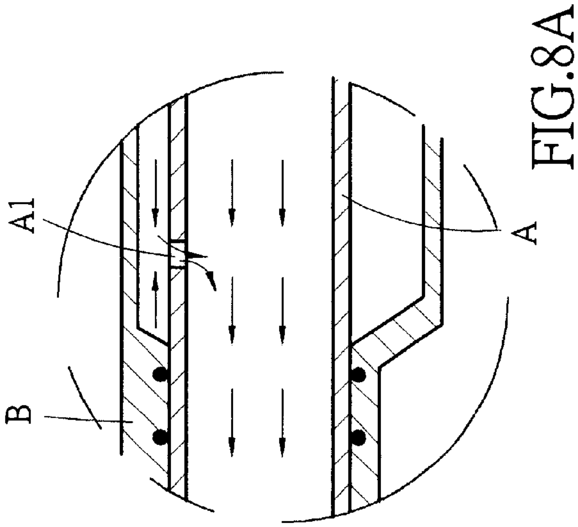
FIG.8A Prior Art
FIGS. 8, 8A and 8B are side and partially sectional views of a conventional straight sprinkling gun with mixable detergent.
Figure 8B:
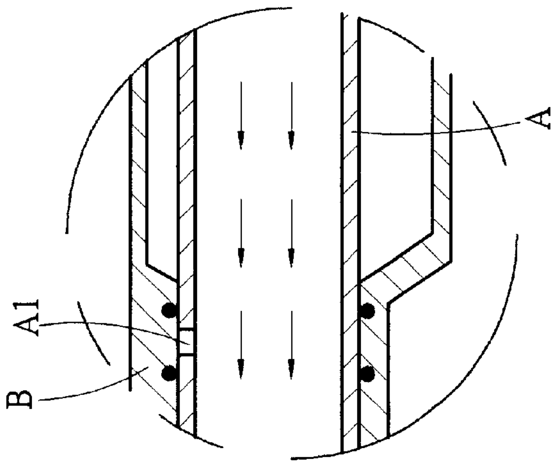
FIG.8B Prior Art
Figure 8:
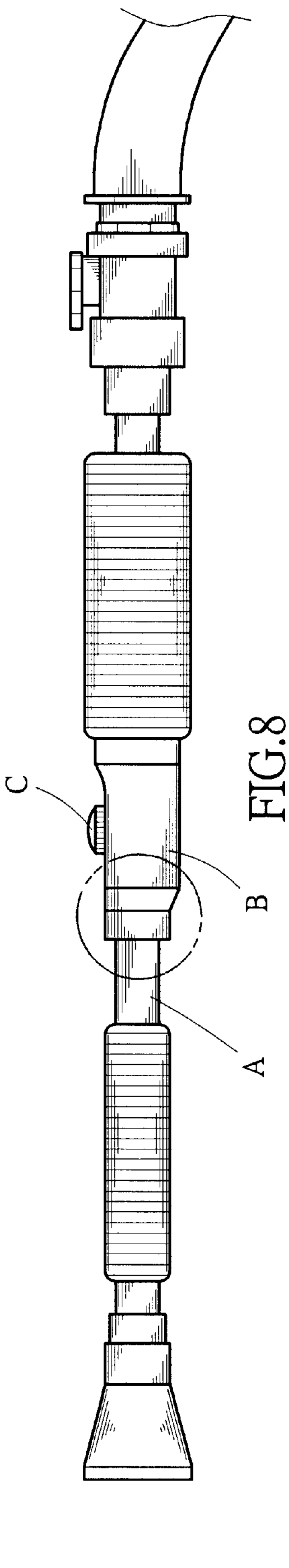
FIG.8 Prior Art

Please refer to FIGS. 1 to 7. The switch 1 of the straight sprinkling gun includes an outer sleeve 11, a middle sleeve 12, a central tube 13, a detergent chamber 14, a main flow tube 15 and a flow damper unit 16.

The outer sleeve 11 has two open ends. One of the two ends is formed with a radial first flange 111 and a first outer wall 112 outward extending by a certain height. The inner side of the first flange 111 is formed with a first engaging section 111' inward extending from the inner circumference thereof by a certain height. The inner wall of the outer sleeve 11 is formed with a projecting section 111" extending by a certain length and height in a direction normal to the radius of the outer sleeve 11.

The outer diameter of the middle sleeve 12 is smaller than the inner diameter of the outer sleeve 11, while being larger than the inner diameter of the first flange 111. The middle sleeve 12 has two open ends. One end of the middle sleeve 12 is formed with a second engaging section 12' outward extending by a certain height corresponding to the first flange 111. The outer wall of the second engaging section 12' is formed with a dented section 12" corresponding to the projecting section 111". The second engaging section 12' and the first engaging section 111' are fitted and engaged with each other and the dented section 12" and the projecting section 111" are fitted and engaged with each other, whereby the middle sleeve 12 is fixedly disposed in the outer sleeve 11 and abuts against the first flange 111.

The outer circumference of the other end of the middle sleeve 12 is formed with a middle wall 121 outward extending by a certain height and having an outer diameter corresponding to the inner diameter of the outer sleeve 11. By means of the first flange 111 and the middle wall 121, the outer side of the middle sleeve 12 is sealed in the outer sleeve 11 to form a water flow passage 113. In addition, a predetermined portion of the inner wall of the middle sleeve 12 is formed with a radial first partitioning face 122.

The side wall of the middle sleeve 12 between the first flange 111 and the first partitioning face 122 is formed with at least one outlet 123. The side wall of the middle sleeve 12 opposite to the first partitioning face 122 and other than the side wall with the outlet 123 is formed with at least one first inlet 124. In this embodiment, the outlet 123 and the first inlet 124 are a pair and 180 degrees opposite to each other.

The outer diameter of the central tube 13 corresponds to the inner diameter of the middle sleeve 12 and has a close end 131 and an open end 132. The central tube 13 is disposed in the middle sleeve 12 with the close end 131 opposite to the first partitioning face 122, whereby the middle sleeve 12 is rotatable about the central tube 13. The side wall of the central tube 13 is formed with a second inlet 133 corresponding to the first inlet 124. The outer side of the close end 131 of the central tube 13 is formed with a first connecting section 131' having a certain length and passing through the first partitioning face 122. The outer diameter of the first connecting section 131' is smaller than the inner diameter of the middle sleeve 12. The inner circumference of the first connecting section 131' is polygonal.

The detergent chamber 14 includes a first and a second chambers 14A, 14B which are tube bodies with a predetermined length. One end of the first chamber 14A is fitted with one end of the second chamber 14B.

The other end of the first chamber 14A has an outer diameter corresponding to the inner diameter of the first outer wall 112 and is rotatably fitted with the first outer wall 112 and is formed with a radial second flange 141. The second flange 141 is formed with a second connecting section 141' which is a column outward projecting by a certain length and having an outer circumference corresponding to the inner circumference of the first connecting section 131'. The second connecting section 141' is fixedly fitted with the first connecting section 131', whereby the outer sleeve 11 and the middle sleeve 12 are synchronously rotatable about the central tube 13 and the first chamber 14A.

A predetermined portion of the inner wall of the second chamber 14B is formed with a radial second partitioning face 142. The circumference of the first chamber 14A positioned between the second flange 141 and the second partitioning face 142 is formed with an incoming hole 143 provided with an openable cover (not shown).

The main flow tube 15 is composed of a tube body extending from the inner circumference of the second flange 141 into the detergent chamber 14 by a predetermined length and another tube body passing through the second partitioning face 142 with outer end exposed to the detergent chamber 14. The two tube bodies are fitted with each other. Alternatively, the main flow tube 15 is formed by a tube body extending from the inner circumference of the second flange 141 into the detergent chamber 14 and passing through the second partitioning face 142 with outer end exposed to the detergent chamber 14. The outer end of the main flow tube 15 is provided with a brush head or a sprinkling head (not shown) with variable sprinkling pattern.

The flow damper unit 16 includes a flow-guiding hole 161 and a communicating section 162.

The flow-guiding hole 161 is formed by an opening projected from the first flange 111 to the second flange 141 corresponding to the second inlet 133. The outer circumference of the flow-guiding hole 161 is formed with a wall body outward projecting by a predetermined height and abutting against the first flange 111.

The communicating section 162 is a channel formed on the outer side of the first flange 111 corresponding to the first inlet 124. The bottom face of the channel extends to the inner circumference of the first flange 111. When rotating the outer sleeve 11 to align the communicating section 162 with the flow-guiding hole 161, the flow-guiding hole 161 is not covered by the first flange 111 and the interior of the detergent chamber 14 communicates with the interior of the outer sleeve 11. However, when the communicating section 162 is not aligned with the flow-guiding hole 161, that is, the flow-guiding hole 161 is covered by the first flange 111, the interior of the detergent chamber 14 does not communicate with the interior of the outer sleeve 11.

According to the above arrangement, a detergent such as a soap water is added from the incoming hole 143 into the detergent chamber 14 and the incoming hole 143 is closed. Then, water flow is conducted into the open end 132 of the central tube 13. The using state of the switch 1 of the straight sprinkling gun of the present invention is as follows:

A. The outer sleeve 11 is rotated. When any first inlet 124 is not aligned with the second inlet 133, no water flow will flow out from the main flow tube 15

B. The outer sleeve 11 is rotated. When the communicating section 162 is not aligned with the flow-guiding hole 161, that is, the first inlet 124 aligned with the communicating section 162 is not aligned with the second inlet 133, while the other first inlet 124 is aligned with the second inlet 133, the water passage is: the open end 132 of the central tube 13→the second inlet 133→the first inlet 124→the water flow passage 113→the outlet 123→the second flange 141→the main flow tube 15→discharge pure water C. The outer sleeve 11 is rotated. When the communicating section 162 is aligned with the flow-guiding hole 161, that is, the first inlet 124 aligned with the communicating section 162 is aligned with the second inlet 133, there are two water passages I. The open end 132 of the central tube 13→the second inlet 133→the first inlet 124→the water flow passage 113→the outlet 123→the main flow tube 15→discharge pure water II. The open end 132 of the central tube 13→the second inlet 133→the first inlet 124→the water flow passage 113→the outlet 123→the flow-guiding hole 161→the detergent chamber 14→the flow-guiding hole 161→the main flow tube 15→discharge soap water The switch 1 of the straight sprinkling gun of the present invention has the following advantages:

1. The water flow-controlling mechanism is circularly rotatable. The switch is positioned at the holding section of the hand so that a user can operate the switch without moving the palm. This meets human configuration.
2. The amount of the discharged water is real-time controlled.
3. The kind of discharged water is real-time selected.
4. When controlling the water amount or selecting the kind of the water, the sprinkling operation is not affected.

In another embodiment, a second outer wall 113 outward extends from the outer circumference of the other end of the outer sleeve 11. The second outer wall 113 has an inner diameter larger than the inner diameter of the outer sleeve 11. A connecting tube body 134 outward extends from the open end 132 of the central tube 13. The connecting tube body 134 has an outer diameter smaller than the inner diameter of the second outer wall 113.

The inner wall of the second outer wall 113 is formed with at least one first locating channel 113'.

The outer wall of the connecting tube body 134 is formed with a second locating channel 134' corresponding to the first locating channel 113' for receiving a locating pin and a spring, whereby when rotating the outer sleeve 11, a locating effect is achieved and perceivable by a user.

The present invention can further have indications respectively disposed on the outer wall of the detergent chamber 14 and the outer wall of the first outer wall 112 of the outer sleeve 11 for indicating using state.

A cover body 144 is disposed at the other end of the second chamber 14B for more sealing the detergent chamber 14. The main flow tube 15 passes through the cover body 144.

The first connecting section 131' is locked with the second connecting section 141' by a screw.

In order to achieve watertight effect, leakproof washers R1, R2, R3, R4, R5, R6 are respectively disposed between the inner wall of the middle wall 121 and the outer wall of the central tube 13 and between the outer wall of the middle wall 121 and the inner wall of the outer sleeve 11 and around the outer circumference of the second inlet 133 and around the outer circumference of the flow-guiding hole 161 and between the outer wall of the detergent chamber 14 and the inner wall of the first outer wall 112 and between the second partitioning face 142 and the cover body 144.

The above embodiments are only used to illustrate the present invention, not intended to limit the scope thereof. Many modifications of the above embodiments can be made without departing from the spirit of the present invention.

What is claimed is:

1. A switch mechanism for a sprinkling gun comprising:

a) a hollow outer sleeve having open opposite ends, the outer sleeve including an inner flange having an L-shaped cross-sectional configuration, a first outer wall at a first end and a second outer wall at a second end;

b) a hollow middle sleeve having open opposite ends and mounted within the outer sleeve so as to form a flow passage therebetween, the middle sleeve including: first inlets passing through a sidewall thereof; outlets passing through a sidewall thereof and spaced from the first inlets; an engaging section at a first end engaging the inner flange of the outer sleeve; and a wall at a second end thereof, the middle and the outer sleeve mounted so as to be rotatable together;

c) a hollow central tube having an open inlet end and a closed, opposite end, a second inlet passing through a sidewall thereof, and a first connecting section extending from the closed end, the central tube mounted in the middle sleeve such that the middle sleeve and outer sleeve are rotatable relative to the central tube, such relative rotation moving the first inlets into and out of alignment with the second inlet; and, d) a hollow main flow tube having a second connecting section extending from a first end thereof and engaging the first connecting section of the central tube, whereby, when the first and second inlets are aligned, flow is permitted in a flow path from the open inlet end of the central tube, the central tube, the first and second inlets, the flow passage between the outer sleeve and the middle sleeve, the outlets in the middle sleeve and the main flow tube, and when the first and second inlets are not aligned, such flow is not permitted.

2. The switch mechanism of claim 1 wherein the first and second connecting sections have non-circular cross-sectional configurations.

3. The switch mechanism of claim 1 further comprising:

a) an axially extending projection in the outer sleeve; and b) an indentation in the middle sleeve engaged by the axially extending projection.

4. The switch mechanism of claim 1 further comprising:

a) a detergent chamber around a portion of the main flow tube, the chamber having a detergent inlet hole, and a flow guiding hole facing toward the inner flange of the outer sleeve; and, b) a communicating channel formed in the inner flange located such that rotation of the outer sleeve moves the communicating channel into and out of communication with the flow guiding hole.

5. The switch mechanism of claim 4 wherein the first and second connecting sections have non-circular cross-sectional configurations.

6. The switch mechanism of claim 4 further comprising:

a) an axially extending projection in the outer sleeve; and b) an indentation in the middle sleeve engaged by the axially extending projection.

* * * * *